United States Patent Office 2,813,902
Patented Nov. 19, 1957

2,813,902
THIOUREA DERIVATIVES

Alfred Margot and Hans Gysin, Basel, Switzerland, assignors to J. R. Geigy A.-G., Basel, Switzerland, a Swiss firm No Drawing. Application April 4, 1956,
Serial No. 575,929

Claims priority, application Switzerland April 6, 1955

4 Claims. (Cl. 260—556)

The present invention is concerned with a process for the production of new thiourea derivatives as well as with fungicidal agents which contain such compounds as active ingredients, and their use for the control of fungi.

Surprisingly, it has now been found that N-sulphonyl thioureas of the general formula:

$$R_1-SO_2-NH-CS-NH-R_2$$

wherein $R_1$ represents a low molecular alkyl radical or a phenyl, chlorophenyl or methylphenyl radical and $R_2$ represents hydrogen or an alkyl, allyl, phenyl, chlorophenyl, methylphenyl or benzyl radical, which phenyl or benzyl radicals possibly also contain chemically indifferent substituents, can be reacted with one mol of perchloromethylmercaptan (trichloromethane sulphenyl chloride) in a non-alkaline medium, advantageously in acid, aqueous suspension or solution or in inert organic solvents while splitting off hydrogen chloride, to form reaction products which have excellent fungicidal properties.

Because of their manner of formation, their relative instability in an alkaline medium and, in contrast thereto, their surprising stability in an acid medium, the reaction products obtained according to the present invention are S-trichloromethane sulphenyl derivatives of N-sulphonylated isothioureas, corresponding to the general formula:

$$R_1-SO_2-NH-C=N-R_2$$
$$\phantom{R_1-SO_2-NH-C=N-R_2}|$$
$$\phantom{R_1-SO_2-NH-C=N}S-S-CCl_3$$

wherein $R_1$ and $R_2$ have the meanings given above. A practically quantitative yield is obtained by the reaction which proceeds quickly and easily without the addition of acid binding agents even at room temperature in organic solvents which are inert at that temperature, or also in aqueous suspension. In both cases it is unnecessary to bind the hydrochloric acid which is liberated during the reaction as the reaction products are stable in the cold also in strongly acid solution. On the other hand, the reaction cannot be performed in an alkaline medium as it proceeds differently or because of the decomposition of the reaction products first formed.

Reaction products according to the present invention can also be obtained, though if in less yield, if perchloromethylmercaptan is reacted with sulphonyl thioureas as defined in the presence of alkali or if perchloromethylmercaptan is reacted with alkali salts of sulphonyl thioureas. The reaction products according to the present invention are obtained only at the moment when, due to liberation of hydrochloric acid on decomposition of perchloromethylmercaptan or primary reaction products thereof, the reaction mixture becomes acid and thus the conditions for the reaction according to the present invention are produced.

The reaction products obtained according to the present invention are mostly solid substances which can be recrystallised for example from alcohols or ether.

There are various methods for the production of the sulphonyl thioureas necessary as starting materials, the suitability of which to some extent depends on the type of the radicals $R_1$ and $R_2$. These have been summarised by F. Kurzer in Chemical Reviews 50, 1–46, (1952). Examples are the addition of hydrogen sulphide to sulphonyl cyanamides of the formula $R_1-SO_2-NH-CN$ (ibid. 9) for starting materials in which $R_2$=hydrogen and the reaction of sulphonamides of the formula $R_1-SO_2-NH_2$ with mustard oils (isothiocyanates) of the formula $R_2-NCS$ (ibid. 7) for starting materials in which $R_2$ is different from hydrogen.

Examples of known starting materials are N-butane sulphonyl and N-benzene sulphonyl thiourea, N-methane sulphonyl and N-benzene sulphonyl-N'-phenyl thiourea and N-benzene sulphonyl-N-benzyl thiourea. Other starting materials can be produced in an analogous manner.

The following examples further illustrate the performance of the reaction of the sulphonyl thioureas with perchloromethylmercaptan according to the present invention. Parts are given as parts by weight and the temperatures are in degrees centigrade.

*Example 1*

21.6 parts of N-benzene sulphonyl thiourea are suspended in 150 parts of benzene and 19 parts of perchloromethylmercaptan are added dropwise at about 20° while stirring. On stirring at room temperature a complete solution is obtained after a few minutes, hydrogen chloride is given off and the N-benzene sulphonyl-S-trichloromethane sulphenyl isothiourea begins to precipitate in the form of colourless needles. After 4–5 hours, the reaction is practically completed, the mixture is filtered under suction and the filter residue is washed well with cyclohexane. The N-benzene sulphonyl-S-trichloromethane sulphenyl isothiourea obtained in good yield in this way is colourless and melts at 122–124°. Recrystallised from isopropyl alcohol it melts at 123–124°.

*Example 2*

29.2 parts of N-benzene sulphonyl-N'-phenyl thiourea are suspended in 250 parts of water. The reaction of the suspension is made acid to Congo red paper by the addition of a few drops of hydrochloric acid and then 19 parts of perchloromethylmercaptan are added at about 20° while stirring well. The mixture is stirred for another 24 hours, filtered under suction and the filter residue is washed neutral with water. The crude N-benzene sulphonyl-N'-phenyl-S-trichloromethane sulphenyl isothiourea obtained in good yield in this manner can be further purified by recrystallization from isopropyl alcohol or chloroform/cyclohexane when it then melts at 130–131°.

*Example 3*

21 parts of N-methane sulphonyl-N'-n-butyl thiourea, obtained by known method from methane sulphamide and butyl mustard oil, are suspended in 200 parts of water and the reaction is made acid to Congo red paper with a little hydrochloric acid. 19 parts of perchloromethylmercaptan are then added dropwise at about 20° while stirring well and the whole is stirred for 24 hours at room temperature. Chloroform is added, the layers are separated, the chloroform layer is washed several times with water and then the solvent is evaporated off. The N-methane sulphonyl-N'-n-butyl-S-trichloromethane sulphenyl isothiourea which remains crystallises after the addition of a little cyclohexane and can be recrystallised from ether, M. P. 63–64°.

In an analogous manner 19 parts of perchloromethylmercaptan can be reacted with:

23 parts of N-methane sulphonyl-N'-phenyl thiourea to produce N-methane sulphonyl-N'-phenyl-S-trichloromethane sulphenyl isothiourea, M. P. 117–118°, 16.4 parts of N-methane sulphonyl-N'-methyl thiourea to produce N-methane sulphonyl-N'-methyl-S-trichloromethane sulphenyl isothiourea, M. P. 136–137°, 19.4 parts of N-methane sulphonyl-N'-allyl thiourea to produce N-methane sulphonyl-N'-allyl-S-trichloromethane sulphenyl isothiourea which is of a honey-like consistency, 23 parts of N-benzene sulphonyl-N'-methyl thiourea to produce N-benzene sulphonyl-N'-methyl-S-trichloromethane sulphenyl isothiourea, M. P. 125–127°, 25 parts of N-(4-chloro-benzene sulphonyl)-thiourea to produce N-(4-chloro-benzene sulphonyl)-S-trichloromethane sulphenyl isothiourea, M. P. 128–129°, 28 parts of N-p-toluene sulphonyl-N'-allyl thiourea to produce N-p-toluene sulphonyl-N'-allyl-S-trichloromethane sulphenyl isothiourea, 24.4 parts of N-methane sulphonyl-N'-benzyl thiourea to produce N-methane sulphonyl-N'-benzyl-S-trichloromethane sulphenyl isothiourea, 30.6 parts of N-isopropane sulphonyl-N'-(p-chlorophenyl)-thiourea to produce N-isopropane sulphonyl-N'-(p-chloro-phenyl)-S-trichloromethane sulphenyl isothiourea, 21 parts of N-n-butane sulphonyl-N'-methyl thiourea to produce N-n-butane sulphonyl-N'-methyl-S-trichloromethane sulphenyl isothiourea, 24.4 parts of N-methane sulphonyl-N'-p-tolyl thiourea to produce N-methane sulphonyl-N'-p-tolyl-S-trichloromethane sulphenyl isothiourea, 19.6 parts of N-methane sulphonyl-N'-isopropyl thiourea to produce N-methane sulphonyl-N'-isopropyl-S-trichloromethane sulphenyl isothiourea (M. P. 99–101°) and with 23.8 parts of N-methane sulphonyl-N'-n-hexyl thiourea to produce N-methane sulphonyl-N'-n-hexyl-S-trichloromethane sulphenyl isothiourea which melts at 71–72°.

The new thioureas can be used in a finely distributable form as such or can be used in combination with suitable carriers and distributing agents for the protection of plants and parts thereof from attack by injurious fungi. They are also suitable for the treatment of organic materials such as, for example, wood, textiles, hides and leather. They can also be used however, in combination with other fungicidal or insecticidal substances.

For example, the new active ingredients can be combined with solid pulverulent carriers such as, for example, talc, kaolin, bole, bentonite, chalk or ground limestone. The pulverulent fungicides obtained can be made suspendible in water if desired, by the addition of suitable wetting and dispersing agents, attention being paid in the choice thereof to the sensitivity to alkali of the active ingredients. Also the active ingredients can be suspended in water as such in a solid finely ground form with the aid of capillary active substances, or, after dissolving them in organic solvents, they can be emulsified in water with the aid of suitable emulsifiers. Further, the active ingredients can be dissolved in organic solvents also, e. g. in chlorinated hydrocarbons such as trichlorethylene, or in medium petroleum fractions, possibly with the addition of auxiliary solubility promoters such as acetone or higher ketones. Finally, the active ingredients can be distributed in the air in the form of aerosols, smoke or mist, in particular in store rooms and greenhouses.

Example 4

2–5 parts of active ingredient, e. g. N-methane sulphonyl-N'-n-butyl-S-trichloromethane sulphenyl isothiourea are finely ground with 98–95 parts of talc. The dusting agent so obtained can be used for example for the disinfection of bedding earth as well as for the dusting of plants or parts thereof such as bulbs and nodules.

If the amount of active ingredient is raised to 15 parts and some urea is added, then a dry seed dressing is obtained which has a strong fungicidal action and at the same time does not adversely influence the germination.

Example 5

By grinding together 10 parts of N-benzene sulphonyl-S-trichloromethane sulphenyl isothiourea and 82 parts of kaolin or chalk and mixing with 8 parts of wetting and dispersing agents, e. g. ethylene oxide condensation products of alkyl phenols, a concentrate is obtained which, on mixing with water, produces a fungicidal spraying agent which is excellently suitable for the treatment of parts of plants above the ground.

Example 6

20 parts of N-benzene sulphonyl-N'-allyl-S-trichloromethane sulphenyl isothiourea, 50 parts of xylene and 30 parts of ethylene oxide condensation products of alkyl phenols are mixed together and an emulsion concentrate is obtained which can be used for the preparation of emulsions for plant protection.

A concentrate for the production of less strongly wetting emulsions is obtained by mixing 25 parts of active ingredient, 67 parts of xylene and 8 parts of ethylene oxide condensation products.

What we claim is:
1. A thiourea derivative corresponding to the formula:

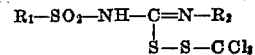

wherein $R_1$ represents a member selected from the group consisting of lower alkyl, phenyl, chlorophenyl and methylphenyl, and $R_2$ represents a member selected from the group consisting of hydrogen, alkyl, allyl, phenyl, chlorophenyl, methylphenyl and benzyl radicals.

2. N-benzene sulphonyl-S-trichloromethane sulphenyl isothiourea.

3. N-methane sulphonyl-N'-n-butyl-S-trichloromethane sulphenyl isothiourea.

4. N - 4 - chlorobenzene sulphonyl-S-trichloromethane sulphenyl isothiourea.

No references cited.